Feb. 25, 1969   L. A. LUCIETTO ETAL   3,429,539
ARTICLE SUPPORTING BRACKET FOR ATTACHMENT TO CHANNELS
Filed Aug. 14, 1967
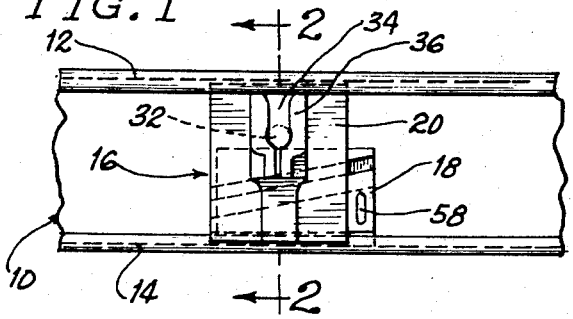
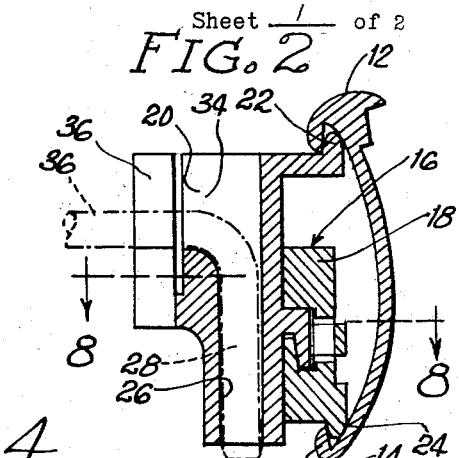
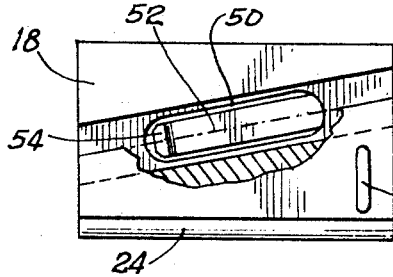
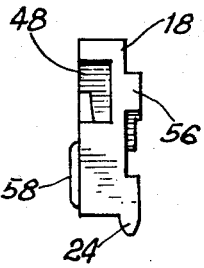
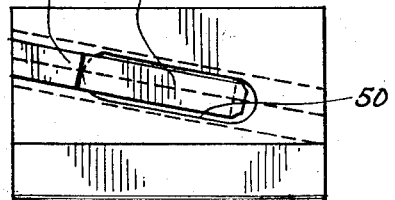
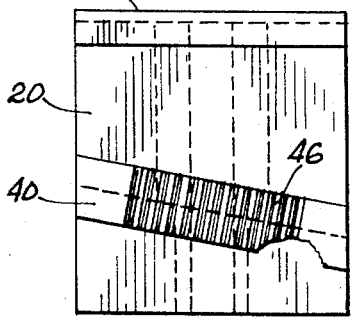
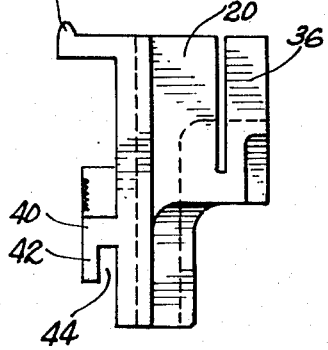
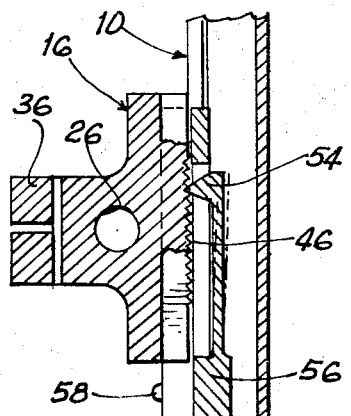
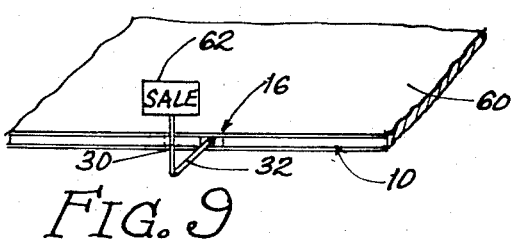
INVENTORS
Lambert A. Lucietto
Ledo B. Lucietto
by McDougall, Hersh, Scott
and Ladd   Attys Feb. 25, 1969  L. A. LUCIETTO ETAL  3,429,539
ARTICLE SUPPORTING BRACKET FOR ATTACHMENT TO CHANNELS
Filed Aug. 14, 1967

ABSTRACT HERE

United States Patent Office 3,429,539
Patented Feb. 25, 1969

3,429,539
ARTICLE SUPPORTING BRACKET FOR ATTACHMENT TO CHANNELS
Lambert A. Lucietto, 2341 N. Melvina Ave., Chicago, Ill. 60639, and Ledo B. Lucietto, 3721 N. Scott St., Schiller Park, Ill. 60176
Filed Aug. 14, 1967, Ser. No. 660,272
U.S. Cl. 248—228
Int. Cl. G09f 7/18; A47f 9/00; E04g 3/14
14 Claims

ABSTRACT OF THE DISCLOSURE

A bracket for attaching to a pricing channel or the like comprising a main body portion having a lip along one edge for engagement with one flange defined by the channel. A wedge portion is associated with the body portion, and the wedge portion defines a lip which is positioned at the opposite side of the bracket for engagement with the other flange of the channel. Track means interconnect the wedge portion and body portion, and these track means define an inclined path so that movement of the respective bracket portions will move the lips toward and away from each other whereby the lips will move into and out of engagement with the channel flanges. Ratchet teeth are defined by the main body portion, and a pawl is defined by the wedge portion for purposes of locking the bracket portions in position.

---

This invention relates to a bracket construction for attachment to channel members. One specific application of the invention involves attachment to a price channel of the type usually secured to shelves in stores. The invention will be specifically described with respect to such channels; however, it will be obvious that the bracket could be associated with other types of supports.

Pricing channels are commonly associated with shelves so that price indicating cards can be positioned in the channel in immediate association with goods positioned on the shelves. The channels and cards are designed so that they can be easily removed or their positions shifted as changes in stock positions and prices require.

It is often desirable to associate additional information with certain goods on a shelf. For example, the manager of a store may decide to highlight a particular line of goods if a sale is being conducted. Various other means can also be employed to attract individuals and for purposes of providing information beyond the price of the goods.

Various devices have been developed for purposes of attaching articles other than pricing cards to pricing channels. Such devices have, however, been relatively complicated in design and have lacked versatility. Thus the devices were expensive and would not support a sufficient variety of articles of the type used for indicating a special sale, attracting attention, or providing additional information to a customer.

It is a general object of this invention to provide a bracket construction which is ideally suitable for attachment to channel members whereby the bracket can be employed for supporting a variety of different articles.

It is a more specific object of this invention to provide a bracket construction of the type described which is relatively uncomplicated in design, easily manufactured and operated, and which can be utilized for supporting a wide variety of articles.

These and other objects of this invention will appear hereinafter and for purposes of illustration, but not of limitation, specific embodiments of the invention are shown in the accompanying drawing in which:

FIGURE 1 is a fragmentary front elevational view of a price channel having a bracket of the type contemplated by this invention associated therewith;

FIGURE 2 is an enlarged cross-sectional view taken about the line 2—2 of FIGURE 1;

FIGURE 3 is a front elevational view of the wedge portion of the bracket;

FIGURE 4 is an end elevation of the wedge portion;

FIGURE 5 is a rear elevation of the wedge portion;

FIGURE 6 is a rear elevational view of the main body portion of the bracket;

FIGURE 7 is a side elevational view of the body portion;

FIGURE 8 is a horizontal sectional view taken about the line 8—8 of FIGURE 2;

FIGURE 9 is a fragmentary perspective view illustrating the manner in which the bracket can be used as an article supporting means;

Figure 10:
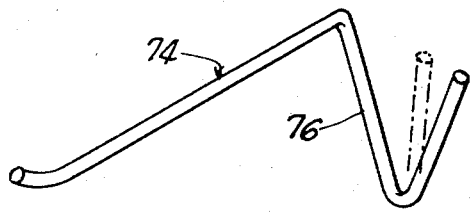
FIGURE 10 is a detailed view of a supporting rod adapted to be associated with a modified form of the invention.

The bracket construction of this invention generally comprises an assembly suitable for association with a channel member, such as a pricing channel, defining upper and lower flanges. The bracket includes a main body portion which defines a lip along one edge for engaging one of the flanges. A portion is associated with the main body portion and this provides a lip along the opposite edge of the bracket for engagement with the other flange.

A track is defined by one of the bracket portions, and this track is inclined relative to the engaging lips. The other bracket portion defines means engaging the track so that movement of the bracket portions relative to each other will result in movement of the lips toward and away from each other. The assembly also includes a ratchet and pawl arrangement so that when the lips are moved into engagement with the channel flanges, the wedge portion and body portion will be retained against movement.

The accompanying drawings illustrate a pricing channel 10 defining an upper flange portion 12 and a lower flange portion 14. The channel illustrated is of a conventional design whereby pricing cards or the like can be inserted between the flanges. Usually the cards are resiliently held in position by providing a slight bend in the cards, and this arrangement permits easy insertion and removal, and it also permits sliding of the cards along the length of the channels. It will be understood that various designs of pricing channels, as well as channels used for other illustrations could be provided with brackets of the type contemplated by this invention.

The bracket 16 consists of a main body portion 20, and a wedge portion 18. These bracket portions are assembled together in a manner such that a lip 22 defined by the main body portion will engage the flange 12 while a lip 24 defined by the wedge portion will engage the flange 14.

The main body portion 20 defines a vertical portion 26 which is adapted to receive the end portion 28 of an article supporting rod 30. The shank portion 32 of this rod is received in a slot 34 defined by the main body portion. This slot is defined at least in part by opposed arms 36, the interior faces of which are spaced apart a distance slightly less than the diameter of the rod 30. With this arrangement, the rod can be seated in the channel and resiliently held by the main body portion. A more complete description of the retaining means for the rod can be found in applicants' copending application Ser. No. 658,570, filed Aug. 4, 1967, and entitled "Bracket for Mounting on Apertured Panel."

It will be understood that the particular rod attaching means described comprises a preferred aspect of the instant invention in that the rods can be easily changed to rods of many different designs to thereby provide a great deal of versatility in the construction. Other means for supporting articles from the main body portion are, however, contemplated.

A track 40 is integrally formed on the back side of the main body portion 20. This track includes a flange 42 and a channel 44 is defined between the flange and the main body portion. The outer face of the flange defines ratchet teeth 46. The flange is inclined relative to the lip 22 of the main body portion.

The wedge portion 18 comprises a substantially rectangular member with an inclined passage 48 being defined along its length. The passage 48 is dimensioned so that the track 40 can be inserted in the cut out to permit sliding movement of the wedge portion relative to the main body portion.

An opening 50 is defined in the rear wall of the wedge portion, and a pawl 52 extends over this opening. A finger 54 is formed at the free end of the pawl while the opposite end of the pawl is integrally fixed to the wedge portion at 56.

In operation, the wedge portion 18 is assembled with the body portion 20 by inserting the track 40 within the passage 48. When the wedge portion is moved inwardly relative to the body portion, the lips 22 and 24 are gradually moved apart. When this movement takes place while the bracket is positioned between the flanges 12 and 14, the bracket will eventually become secured between these flanges.

The pawl and ratchet arrangement serves to resist unlocking of the bracket when it has been secured to a channel. Thus, the finger 54 normally presses against the ratchet teeth. This is accomplished by forming the finger so that it will extend a short distance into the passage 48. The finger is, thus, pushed away by the ratchet during relative movement but is constantly urged into engagement with the ratchet due to its natural tendency to assume its normal position.

To unlock the bracket from the position shown in FIGURE 1, the wedge portion 18 must be moved to the right relative to the body portion 20. It will be apparent that, due to the inclination of the track 40 and passage 48, this will cause the lips 22 and 24 to move toward each other whereby the bracket will be released.

In the embodiment shown, the track 40 is provided with a plurality of teeth 46. Obviously, this permits use of the bracket in conjunction with pricing channels of various sizes since the locking position can vary considerably.

In some instances, pricing channels may be of uniform size, and for that reason, even a single detent on the track could serve the desired function since the locking action would always take place at the same point. One or more additional detents could then be provided to accommodate other specific positions. In this connection, the instant invention provides an additional advantage since the ratchet teeth, or a locking detent, will serve to hold the wedge portion and body portion together even in the unlocked position.

To assist in unlocking the bracket, a tang 58 is formed on the front face of the wedge 18. A screwdriver can be employed to assist in moving the wedge portion by inserting the end of the screwdriver between the tang and the adjacent side wall of the body portion and by then twisting the screwdriver. Obviously, other implements such as a coin, could also be employed for this purpose.

FIGURE 9 illustrates a shelf 60 having a pricing channel 10 attached thereto with a bracket 16 secured to the pricing channel. The rod 30 carries a sign 62, illustrating one possible application for the bracket.

Figure 11:
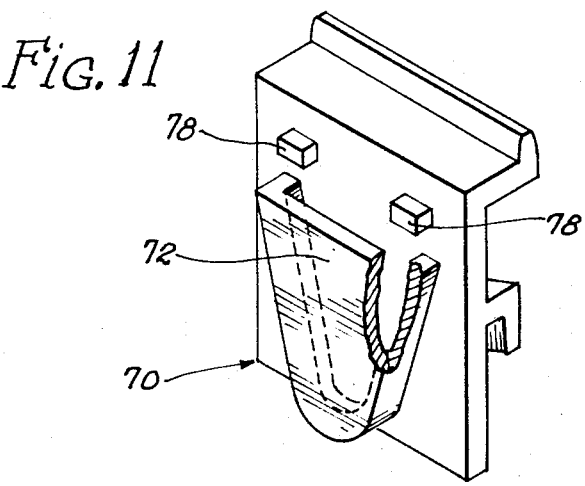
FIGURE 11 is a perspective view of a modified bracket structure.
Figure 12:
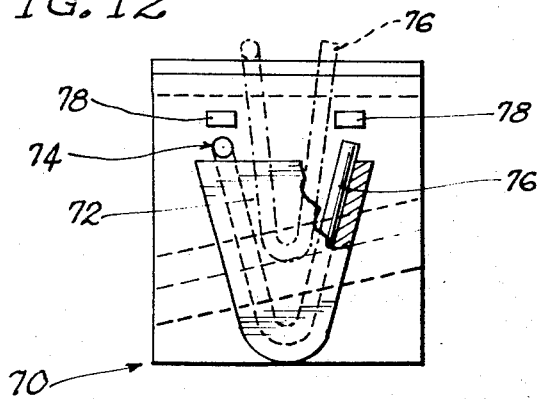
FIGURE 12 is a front elevation of the bracket structure shown in FIGURE 11.

FIGURES 10 through 12 illustrate a modified bracket construction 70. The bracket design is the same as that described with respect to FIGURES 1 through 8 in that a wedge portion and main body portion is assembled together and moved relative to each other to achieve the desired locking and releasing action.

The construction 70 also defines a pocket 72 formed on its front face. A supporting rod 74 defines a V-shaped end 76. This rod is adapted to be seated in the pocket, and flange elements 78 are formed immediately above the pocket to lock the supporting rod in place. As best shown in FIGURE 12, the flanges 78 define an opening through which the rod can be moved as it is inserted into the pocket. When the rod is completely within the pocket, it will snap into position beneath the flanges and locked in place. The rod can be removed by pressing the portions beneath the flanges together, and then moving them upwardly through the opening between the flanges.

It will be apparent that a large number of different types of rods could be attached to the bracket for purposes of carrying signs or a variety of other articles. Furthermore, the bracket itself could be designed for directly supporting a variety of articles.

The separate parts of the bracket assembly can be easily manufactured, for example, by means of conventional stamping or molding operations, and metal or plastic materials could be employed. Accordingly, an economical construction is made available, and the use of the construction is extremely simple whereby efficiency will be provided during use. Finally, a great deal of versatility will be available from the standpoint of supporting articles, particularly in the case of the preferred form of the invention.

It will be understood that various changes and modifications may be made in the above described construction which provide the characteristics of this invention without departing from the spirit thereof, particularly as defined in the following claims.

That which is claimed is:

1. A bracket for attachment to a channel member whereby said bracket can be employed for supporting articles in position adjacent the channel member, said channel member including opposed outwardly extending flanges, said bracket comprising a main body portion defining a lip along one edge for engagement with one of said flanges, and a wedge portion defining a lip along one edge for engagement with the other flange, a track defined by one of said bracket portions, said track being inclined relative to said lips, and means defined by the other bracket portion adapted to engage said track, movement of said bracket portions relative to each other operating to change the relative distance between said lips to provide for engagement and disengagement with said flanges, and ratchet means formed on said bracket portions for resisting movement of said bracket portions relative to each other.

2. A construction in accordance with claim 1 wherein said first mentioned lip is defined by an extension formed rearwardly of said main body portion, and wherein said wedge portion is received in a recessed area beneath said extension at the back of said main body portion, said lips being thereby positioned in the same plane.

3. A construction in accordance with claim 1 wherein said track comprises a channel formed on said main body portion, and including means formed on said wedge portion received within said channel.

4. A construction in accordance with claim 3 wherein the section of said main body portion defining said channel defines an outer surface, ratchet teeth formed on said outer surface, said ratchet teeth defining an inclined path corresponding to the inclination of said channel, and a resiliently mounted pawl carried by said wedge portion pressing against said teeth.

5. A construction in accordance with claim 4 wherein said pawl comprises an elongated arm having one end fixed relative to said wedge portion and the other end free, said other end defining a finger for engagement with said ratchet teeth.

6. A construction in accordance with claim 5 wherein said pawl is positioned within a cut-out defined by said wedge portion, and wherein said pawl is inclined at the same angle as said channel.

7. A construction in accordance with claim 1 including a tang formed on the front surface of said wedge portion adjacent a side edge of said main body portion whereby a tool can be inserted between said tang and said side edge to force said wedge portion and said main body portion apart.

8. A construction in accordance with claim 1 including an article supporting rod adapted to be secured to said bracket, said rod including an end portion, and an opening defined at the front of said bracket for receiving said end portion.

9. A construction in accordance with claim 8 wherein said rod comprises a shank portion extending at an angle away from said end portion, and including opposed arms for gripping said shank portion when said end portion is received in said opening, said arms being secured at one end and being free at their opposite ends, said shank portion operating to spread said arms apart as said end portion is inserted into said opening.

10. A construction in accordance with claim 1 wherein said channel comprises a shelf mounted pricing channel.

11. A construction in accordance with claim 3 wherein the section of said main body portion defining said channel defines an outer surface, at least one detent formed on said outer surface, and a resiliently mounted pawl carried by said wedge portion, said pawl being inclined relative to the wedge portion for movement into and out of engagement with the detent along a path corresponding to the inclination of the channel.

12. A construction in accordance with claim 3 wherein said wedge portion is locked in position relative to the channel when said lips are disengaged whereby the wedge portion and body portion will remain assembled.

13. A construction in accordance with claim 8 wherein said rod is adapted to be received within a pocket formed on the front of said bracket.

14. A construction in accordance with claim 13 wherein said rod defines a V-shaped end, the opposed arms of said V-shaped end being pressed together when inserted within said pocket, and including outwardly projecting flanges extending over the top of said pocket for engagement with the ends of said opposed arms when the rod is positioned within the pocket.

References Cited

UNITED STATES PATENTS

| | | | |
|---|---|---|---|
| 3,015,177 | 1/1962 | Hembo et al. | 40—10 |
| 3,015,897 | 1/1962 | Hopp | 40—11 |
| 3,162,965 | 12/1964 | Snediker | 248—223 |
| 3,214,122 | 10/1965 | Frederickson | 248—223 |
| 3,288,414 | 11/1966 | Fortunato | 248—223 |

ROY D. FRAZIER, *Primary Examiner.*

J. FRANKLIN FOSS, *Assistant Examiner.*

U.S. Cl. X.R.

40—10; 248—223